US008817833B2

(12) United States Patent
von Borstel

(10) Patent No.: US 8,817,833 B2
(45) Date of Patent: Aug. 26, 2014

(54) CONTROLLING TEMPERATURE DIFFERENCES IN A GAS LASER

(71) Applicant: Trumpf Laser- und Systemtechnik GmbH, Ditzingen (DE)

(72) Inventor: Michael von Borstel, Pleidelsheim (DE)

(73) Assignee: TRUMPF Laser-und Systemtechnik GmbH, Ditzingen (DE)

( * ) Notice: Subject to any disclaimer, the term of this patent is extended or adjusted under 35 U.S.C. 154(b) by 0 days.

(21) Appl. No.: 13/714,914

(22) Filed: Dec. 14, 2012

(65) Prior Publication Data

US 2013/0100975 A1 Apr. 25, 2013

Related U.S. Application Data

(63) Continuation of application No. PCT/EP2001/059281, filed on Jun. 6, 2011.

(30) Foreign Application Priority Data

Jun. 16, 2010 (DE) .......................... 10 2010 030 141

(51) Int. Cl.
*H01S 3/04* (2006.01)
*H01S 3/03* (2006.01)

(52) U.S. Cl.
USPC ................................ 372/35; 372/58; 372/107

(58) Field of Classification Search
USPC ............................................ 372/35, 58, 107
See application file for complete search history.

(56) References Cited

U.S. PATENT DOCUMENTS

| 3,900,804 A | 8/1975 | Davis et al. | |
|---|---|---|---|
| 4,481,632 A * | 11/1984 | Herbrich et al. | ................ 372/58 |
| 4,672,621 A * | 6/1987 | Morita et al. | ................... 372/58 |

(Continued)

FOREIGN PATENT DOCUMENTS

| DE | 102006055738 A1 | 5/2008 |
|---|---|---|
| JP | 61208002 A | 9/1986 |

(Continued)

OTHER PUBLICATIONS

Hill et al, "The Quantum Otto Mobile and its Application to Directed Energy", The International Society for Optical Engineering SPIE, USA, vol. 5448, No. 1, Apr. 25, 2004, pp. 84-94.

(Continued)

*Primary Examiner* — Yuanda Zhang
*Assistant Examiner* — Michael Carter
(74) *Attorney, Agent, or Firm* — Fish & Richardson P.C.

(57) ABSTRACT

A gas laser includes discharge tubes connected to together by corner housings, each corner housing including a first cooling channel configured to allow flow of a first coolant. A heat exchanger circuit includes a plurality of second cooling channels configured to allow flow of a second coolant. Each second cooling channel is operable to cool laser gas prior to the laser gas entering into one of the corner housings. The gas laser further includes a temperature control device, in which the temperature control device is selected from the group consisting of a laser gas cooling device, a coolant temperature control assembly, and combinations thereof. The temperature control device is operable to maintain a temperature difference of less than approximately 5 K between the first coolant flowing through the first cooling channel of the corner housing and the laser gas entering into the corner housing.

16 Claims, 3 Drawing Sheets

(56) References Cited

U.S. PATENT DOCUMENTS

| | | | |
|---|---|---|---|
| 4,891,820 A | | 1/1990 | Rando et al. |
| 5,688,418 A | | 11/1997 | Yoshiyasu |
| 5,940,420 A | * | 8/1999 | Blair et al. ............ 372/35 |
| 6,665,327 B1 | * | 12/2003 | von Borstel et al. ............ 372/61 |
| 7,116,501 B2 | * | 10/2006 | Sakamoto ............ 359/820 |

FOREIGN PATENT DOCUMENTS

| | | | |
|---|---|---|---|
| JP | 62156887 A | | 7/1987 |
| JP | 02148779 A | | 6/1990 |
| JP | 02148779 | * | 7/1990 |
| JP | 04127590 A | | 4/1992 |
| JP | 05160470 | * | 6/1993 |
| JP | 05160470 A | | 6/1993 |
| JP | 0983044 A | | 3/1997 |
| WO | WO2008061516 A1 | | 5/2008 |

OTHER PUBLICATIONS

Koslov et al., "Multibeam CW Gas-Discharge CO2 Laser Iglan-3" Soviet Journal of Quantum Electronics, American Institute of Physics, New York, NY, US, vol. 15, No. 3, Mar. 1, 1985, pp. 362-367.

International Search Report from corresponding PCT Application No. PCT/EP2011/059281, mailed Aug. 24, 2011, 6 pages.

Notification of Transmittal of Translation of the International Preliminary Report on Patentability from corresponding PCT Application No. PCT/EP2011/059281, mailed Jan. 3, 2013, 10 pages.

Bitzel et al., "The Laser—a tool for processing flexible materials", The Fascinating World of Sheet Metal, TRUMPF GmbH + Co. Publishers, Chapter 6, 1996, 13 pages.

Bitzel et al., "With light through thick and thin-laser cutting", The Fascinating World of Sheet Metal, TRUMPF GmbH + Co. Publishers, Chapter 7, 1996, 17 pages.

* cited by examiner

CONTROLLING TEMPERATURE DIFFERENCES IN A GAS LASER

CROSS REFERENCE TO RELATED APPLICATIONS

This application is a continuation of and claims priority under 35 U.S.C. §120 to PCT Application No. PCT/EP2011/059281 filed Jun. 6, 2012, which claimed priority to German Application No. 10 2010 030 141.8, filed Jun. 16, 2010. The contents of both of these priority applications are hereby incorporated by reference in their entirety.

BACKGROUND

Gas lasers, in particular $CO_2$ lasers, can include a folded, preferably quadratic laser resonator in which the laser beam is folded quadratically in one or more parallel planes lying one above the other, and in which mirror elements, usually housed in four corner housings, are arranged in each plane. Discharge tubes with electrodes for exciting the laser gas are arranged between the corner housings. The laser gas is fed from a pressure source, which may be in the form, for example, of a radial fan, by feed lines to the corner housings. One or more cooling channels of a heat exchanger circuit are typically arranged in the feed lines to cool down the laser gas prior to entry into the corner housings and hence into the beam guidance chamber. The laser gas circulation path is closed by way of suction lines, by which the heated laser gas is extracted from the discharge tubes and fed to the radial fan.

The corner housings are usually cooled. For that purpose one or more cooling channels though which a cooling fluid, typically water, flows are arranged in a main body of a corresponding corner housing. The cooling channels of the heat exchanger circuit are generally connected to cooling channels of the corner housing and form a common coolant circuit.

With the above-described gas lasers, in particular where resonator lengths are long, a problem can arise where the laser beam undergoes an undesirable change in laser beam direction (in which the change in beam direction is known as beam pointing) in the laser resonator, which may lead to a deterioration of the beam quality.

SUMMARY

The present disclosure relates to controlling temperature differences in a gas laser. Furthermore, the present disclosure is also directed toward minimizing the foregoing undesirable changes in the laser beam direction.

In general, in one aspect, the present disclosure covers gas lasers in which an additional laser gas cooling device is provided for cooling the laser gas and/or a coolant temperature control device for producing a temperature difference between the cooling fluid in the at least one cooling channel of the heat exchanger circuit and the cooling fluid in the at least one cooling channel of the corner housing. In conventional gas lasers, the temperature of the incoming cooled laser gas is typically about 10 K above the temperature of the cooling fluid in the corner housing. Using the additional laser gas cooling device and/or the coolant temperature control device, it is possible to set a difference between the temperature of the cooled laser gas on entry into a corner housing and the temperature of the cooling fluid in the corner housing of less than approximately 5 K, less than approximately 2 K, or less than approximately 0.2 K.

Tilting of the mirror elements arranged in the corner housings is brought about by an asymmetrical expansion of the otherwise generally symmetrical corner housing, in which the expansion is caused by a temperature gradient between the temperature of the laser gas flowing into the corner housing and the temperature of the coolant in the cooling channel of the corner housing. By adjusting the temperature difference to be approximately 5 K or less, the tilting of the mirror elements can be almost completely avoided, so that the change in laser direction caused by the mirror tilting can be reduced. In the ideal case the temperatures of the laser gas and the coolant in the corner block are tuned so that the temperature difference is (virtually) zero.

Tuning the temperature using the coolant temperature control device is especially advantageous when the cooling channel of the primary heat exchanger circuit and the cooling channel of the corner housing belong to two different coolant circuits. In this case, the temperature of the cooling fluid in the cooling channels of the corner block can be set completely independently of the temperature of the cooling fluid in the cooling channels of the heat exchanger.

In some embodiments, the coolant temperature control device includes a heating device for heating up the cooling fluid that is fed to the cooling channel of the corner housing. Alternatively or additionally, the coolant temperature control device may also include a cooling device for cooling the coolant that is fed to the cooling channel or channels of the heat exchanger. When using different coolant circuits, the assemblies of the particular coolant circuit can be used as heating or cooling devices.

When a common coolant circuit is provided, i.e., when the cooling channels of the corner housings are connected to the cooling channels of the heat exchanger circuit and the temperature of the cooling fluid in the two coolant circuits is substantially identical, it can be advantageous if the laser gas is subjected to direct cooling by use of an additional laser gas cooling device. The use of the additional laser gas cooling device allows the temperature of the cooled laser gas to be set independently of the temperature of the cooling fluid in the heat exchanger and the cooling fluid in the corner housing. Various measures can be provided for the additional cooling of the laser gas:

In some embodiments, the additional laser gas cooling device includes an expansion device for adiabatic expansion of the laser gas on entry into the corner housing. In this case, an expansion device can include, for example, an expansion nozzle optionally subjected to open loop or closed loop control, in which the expansion nozzle is provided in a region in which the feed pipe opens into the corner housing. The expansion device thus cools down the laser gas entering the corner housing.

In some embodiments, the additional laser gas cooling device includes a mixing device for admixing additional cold laser gas. The additionally admixed laser gas should have a lower temperature than the laser gas already present in the gas circuit of the gas laser. The amount of laser gas admitted is in this case set, for example, using a controllable valve in such a way that the desired cooling effect is achieved. In this connection, the inlet or the controllable valve for the admixed laser gas is located preferably at the output of the heat exchanger, that is, adjacent to the corner housing.

In some embodiments, the additional laser gas cooling device includes a Peltier element for cooling the laser gas. The laser gas is cooled directly by the Peltier element in addition to being cooled by the heat exchanger, which also adjusts the temperature of the laser gas to match the temperature of the cooling fluid in the corner housing.

The additional laser gas cooling device can also include a second heat exchanger, which is operated with the same coolant of the first heat exchanger, or preferably with a second, different coolant from the coolant of the first heat exchanger. The second coolant can be, for example, a coolant of a cooling assembly that is used to cool the cooling fluid of the coolant flowing through the cooling channels of the first heat exchanger.

In order to obtain a temperature-stable corner housing and hence accurate beam pointing, it may be advantageous to minimize the influence of additional heat sources. In order to achieve this, a thermal insulation can be provided between the mirror element(s) and the corner housing or the main body of the corner housing to avoid transfer of mirror heat from the mirror element or the mirror support to the corner housing. Additionally or alternatively, an additional cooling device for direct cooling of the mirror element can be provided in the corner housing.

In some implementations, it is also advantageous if a resonator frame, on which the corner housings of the gas laser are mounted, has at least one cooling channel. The cooling channel of the resonator frame together with the cooling channel of the corner housing can form a common coolant circuit. Due to the common cooling, the corner housings and the resonator frame have the same, substantially constant temperature.

The present disclosure also relates to a method for operating a gas laser that is constructed as described above. With the gas laser, a difference between the temperature of a cooled laser gas on entry into the corner housing of the gas laser and the temperature of a cooling fluid in at least one cooling channel of the corner housing is set to be less than approximately 5 K, for example, less than approximately 2 K, or less than approximately 0.2 K. The operation of a gas laser in the manner described above can, in some implementations, be especially advantageous when used with resonators having long resonator lengths (e.g., greater than 5 m) or laser processing machines having long beam lengths (e.g., greater than 8 m).

Further advantages will be apparent from the description and the drawings. Similarly, the features mentioned above and hereafter can be used alone or together in any combination. The exemplary embodiments illustrated and described are not to be understood as an exhaustive list but are merely of an exemplary nature for explanation of the invention.

DETAILED DESCRIPTION

Figure 1:
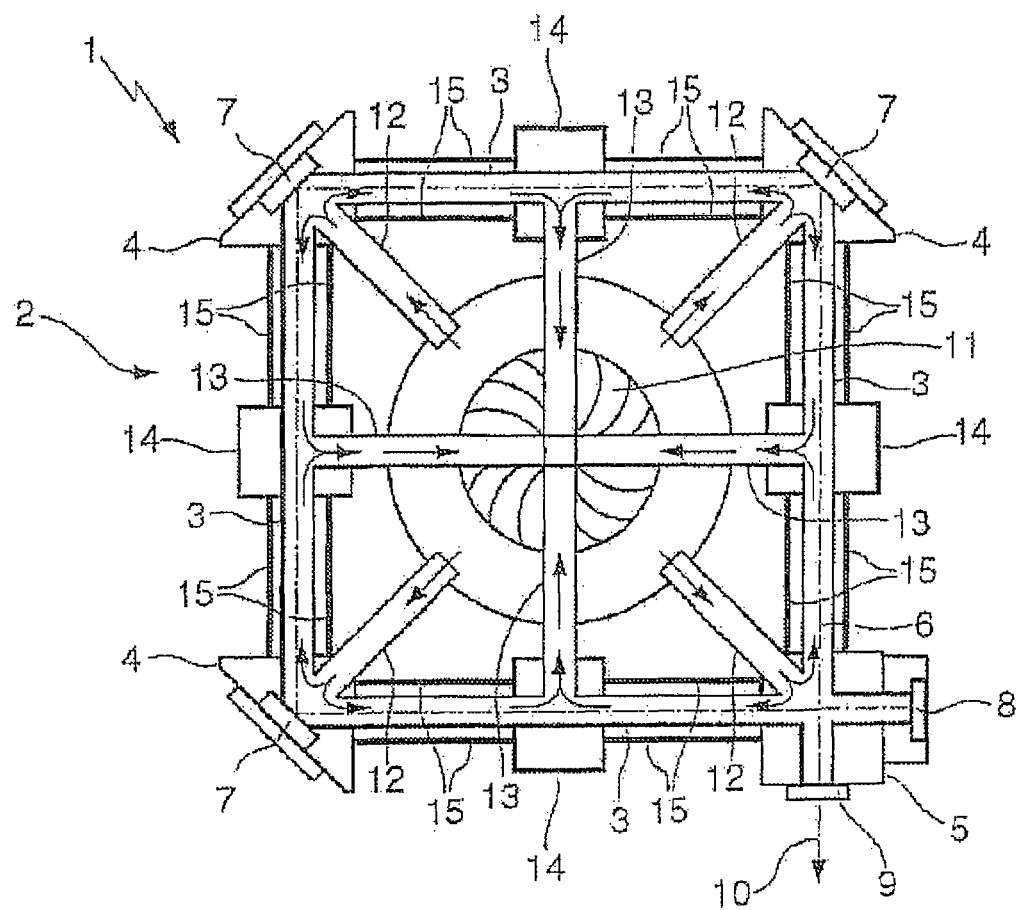
FIG. 1 is a schematic that illustrates a view from above onto a $CO_2$ gas laser with a folded laser resonator in a sectional view.

The $CO_2$ gas laser 1 shown in FIG. 1 includes a quadratically folded laser resonator 2 with four adjoining laser discharge tubes 3, which are connected to one another by corner housings 4, 5. A laser beam 6 running in the direction of the axes of the laser discharge tubes 3 is illustrated by a dot-dash line. Deflecting mirrors 7 in the corner housings 4 serve to deflect the laser beam 6 in each case through 90°. A rear mirror 8 and a partially transmissive output mirror 9 are arranged in one of the corner housings 5. The rear mirror 8 is highly reflective and reflects the laser beam 6 through 180°, so that the beam traverses the laser discharge tubes 3 again in the opposite direction.

A part of the laser beam 6 is coupled out of the laser resonator 2 at the partially transmissive output mirror 9. The other part of the laser beam 6 remains in the laser resonator 2 and passes through the laser discharge tubes 3 again. The laser beam coupled out of the laser resonator 2 by the output mirror 9 is indicated in FIG. 1 with reference numeral 10.

A radial fan 11 is a pressure source for the laser gas and is arranged at the center of the folded laser resonator 2. The radial fan 11 is connected by feed lines 12 for the laser gas to the corner housings 4, 5. Suction lines 13 run between suction housings 14 and the radial fan 11. The flow direction of the laser gas inside the laser discharge tubes 3 and in the feed and suction lines 12, 13 is illustrated by arrows in FIG. 1. The laser gas is excited by electrodes 15, which are arranged adjacent to the laser discharge tubes 3 and are connected to a high frequency (HF) generator (not shown). An X-ray generator having an excitation frequency of 13.56 MHz or 27.12 MHz can be used as the HF generator.

Figure 2:
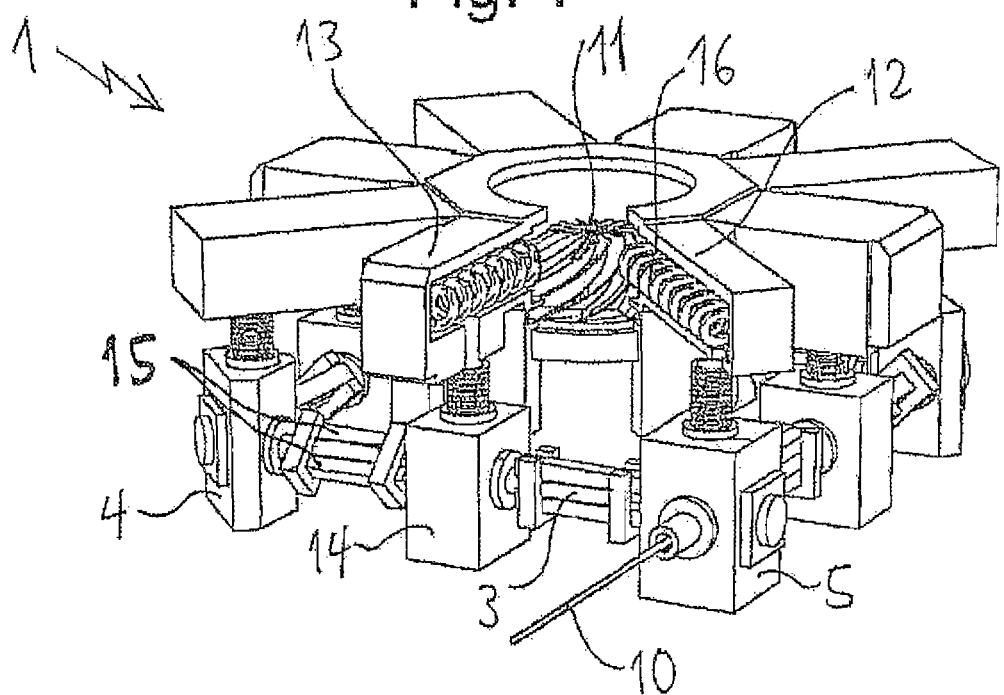
FIG. 2 is a schematic that illustrates a perspective view of the $CO_2$ gas laser of FIG. 1.
Figure 3A:
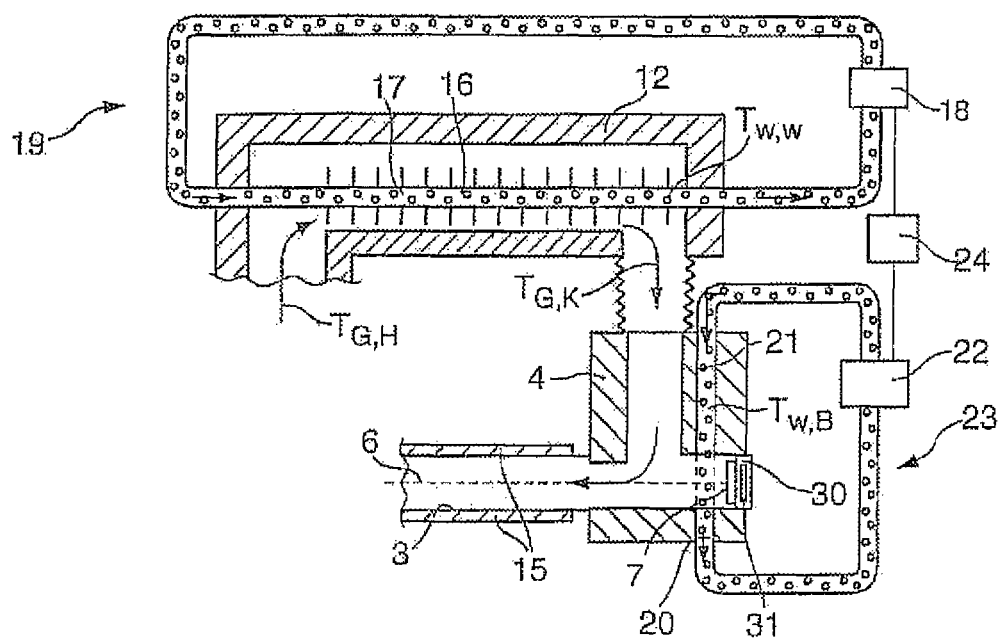
FIG. 3a is a schematic that illustrates a sectional view of a gas laser having two separate coolant circuits.

As shown in FIG. 2 and in particular in FIG. 3a, helical or lamellar cooling channels 16 are provided in the form of cooling tubes, through which a cooling fluid 17 flows. In the present example, water is provided in the feed lines 12. The cooling channels 16 are connected to a cooling assembly 18 and together therewith form a heat exchanger circuit 19. A cooling channel 20 in the form of a cooling bore is provided in the corner housing 4 (see FIG. 3a) and runs through a main body of the corner housing 4. The cooling channel 20 has cooling water 21 flowing through it.

The cooling channel 20 of the corner housing 4 is not, however, connected to the cooling assembly 18 of the heat exchanger circuit 19. Instead, the cooling channel 20 is connected to assembly 22, which together with the cooling channel 20 forms a separate housing block circuit 23. The heat exchanger circuit 19, shown as a closed loop in FIG. 3a, runs not only through the feed line 12, but through all feed lines of the gas laser 1 and through all suction lines 13, which generally involves a parallel connection of several heat exchangers in the form of cooling channels 16. The housing block circuit 23 runs through all corner blocks 4, 5 of the gas laser 1.

The heat exchanger circuit 19 and the housing block circuit 23 are independent of each other, so that the temperature $T_{w,w}$ of the cooling fluid 17 of the heat exchanger circuit 19 and the temperature $T_{w,B}$ of the cooling fluid 21 of the housing block circuit 23 can be set independently of each other, by adjusting the assemblies 18, 22, which serve as temperature control devices. This is advantageous for matching the temperature $T_{G,K}$ of the cold laser gas on entry into the corner housing 4 with the temperature $T_{w,B}$ of the cooling fluid 21 in the cooling channel 20 of the corner housing 4, so that the temperature difference $T_{G,K}-T_{w,B}$ becomes as small as possible. In this way, it is possible to prevent a temperature gradient in the corner housing 4 that causes a tilting of the reflecting mirror 7 arranged therein and hence an incorrect positioning of the laser beam 6.

Assuming, for example, the hot laser gas enters the feed line 12 from the radial fan 11 at a temperature $T_{G,H}$ of about 80° C. and the temperature $T_{W,W}$ of the cooling fluid 17 in the cooling channel 16 is 25° C., the temperature $T_{G,K}$ of the cooled laser gas at the outlet of the feed line 12 is still about 32° C. If it is further assumed that the temperature $T_{w,B}$ of the cooling fluid 21 in the corner housing 4 corresponds to the temperature $T_{W,W}$ of the cooling fluid 17 in the heat exchanger (e.g., about 25° C.), then there is a temperature difference $T_{G,K}-T_{w,B}$ between the cold laser gas in the corner housing 4 and the cooling fluid 17 in the corner housing 4 of about 7 K. This temperature difference is large enough to cause a tilting of the reflecting mirror 7, which has an adverse effect on the beam direction stability of the emerging laser beam 10.

In order to reduce the temperature difference $T_{G,K}-T_{W,B}$, the temperature of the cooling water 17 in the cooling tube 16 should be lower relative to the temperature of the cooling water 21 in the cooling bore 20 of the corner housing 4. In order to achieve this lower relative temperature, the temperature of the cooling water 21 in the corner housing 4 can be increased by the assembly 22 (for example, by 7 K to $T_{W,B}=32°$ C.), so that this corresponds to the temperature $T_{G,K}$ of the entering laser gas. Alternatively, the temperature $T_{w,w}$ of the cooling fluid 17 in the cooling tube 16 can be reduced by the cooling assembly 18 (for example, by about 10 K to $T_{W,W}=15°$ C.), with the result that the cooled laser gas entering the corning housing 4 cools down to the temperature $T_{G,K}$ (e.g., the laser gas cools down to a $T_{G,K}$ of 25° C.), i.e., the temperature $T_{G,K}$ corresponds to the temperature $T_{w,B}$ of the cooling water 21 in the corner block 4.

Both measures can also be carried out simultaneously, i.e., the temperature $T_{W,W}$ of the cooling fluid 17 in the cooling tube 16 is reduced and the temperature $T_{W,B}$ of the cooling fluid 21 in the corner housing 4 is simultaneously increased, so that overall a temperature difference $T_{G,K}-T_{w,B}$ is, for example, not greater than 5 K, not greater than 2 K, or not greater than 0.2 K. In order to set the desired temperature difference, the assemblies 18 and 22 can be controlled by a common control unit 24. Heat sensors can optionally also be provided, which enable the temperatures to be regulated to the above-specified temperature difference range.

Figure 3B:
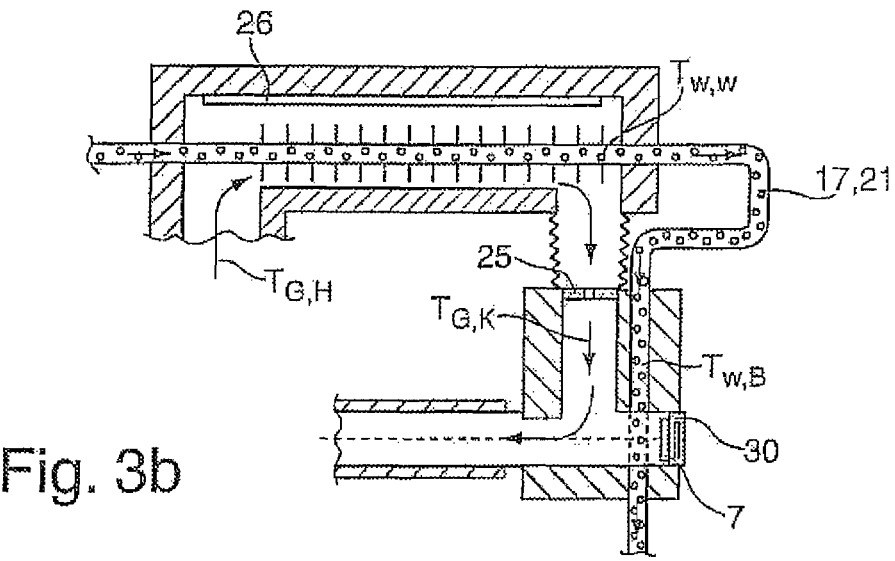
FIG. 3b is a schematic that illustrates a sectional view of a gas laser, in which the gas laser includes an expansion nozzle and a Peltier element.

When a single circuit is provided in place of two separate heat circuits 19, 23, i.e., the cooling tubes 16 of the heat exchanger circuit 19 are connected to the cooling channels 20 of the corner housing 4 (as illustrated in FIG. 3b), it is advantageous to apply additional, direct cooling of the laser gas. For that purpose an additional cooling device can be provided. As shown in FIG. 3b, the additional cooling device can include an expansion nozzle 25 that is arranged at the entry of the corner housing 4. The expansion nozzle 25 causes an adiabatic expansion of the laser gas on entry into the corner housing 4 and hence a cooling to the desired temperature $T_{G,K}$ (for example to a $T_{G,K}$ of 25° C.), which corresponds to the temperature $T_{w,B}$ of the coolant 21 in the cooling channel 20 of the corner housing 4. In addition to or as an alternative to the cooling of the laser gas by the expansion nozzle 25, the cooling device can also include a Peltier element 26, which as shown in the example of FIG. 3b, can be mounted on a wall of the feed line 12.

Figure 3C:
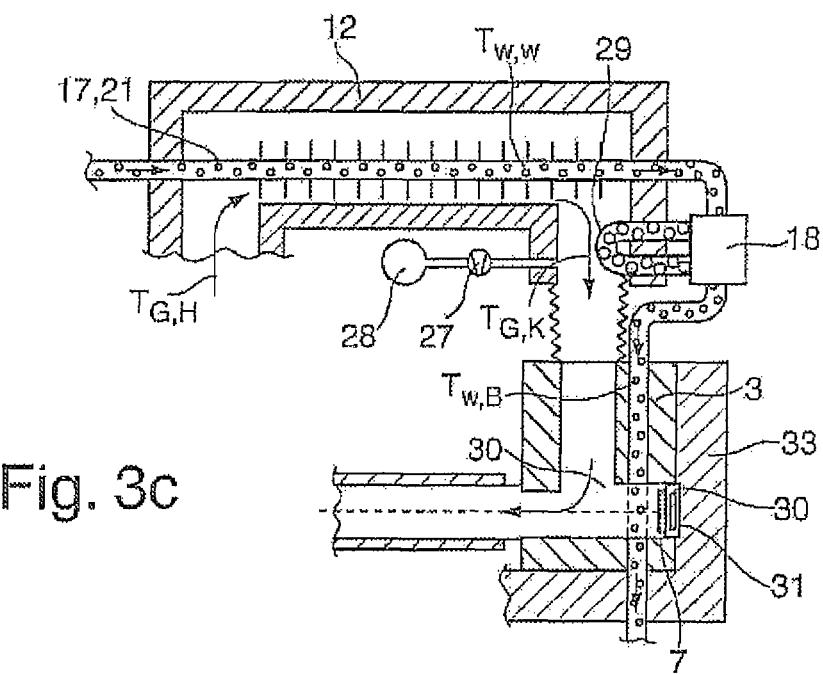
FIG. 3c is a schematic that illustrates a sectional view of a gas laser, in which the gas laser includes a mixing device and an additional heat exchanger.

FIG. 3c illustrates two further possibilities for additional cooling of the laser gas: a first cooling device and a second cooling device. The first cooling device is in the form of a mixing device, where the cooling device includes a controllable valve 27 by which additional cool laser gas from a gas reservoir 28 can be admixed into the gas circulation of the gas laser 1. The admixed amount of gas can be adjusted in such a manner that the temperature of the mixture corresponds to the desired temperature of the laser gas. The second cooling device is in the form of an additional heat exchanger 29, to which cooling fluid of the cooling assembly 18 can be admitted directly. The cooling fluid also can serve to cool the cooling water 17 of the cooling tube 16. Both the additional heat exchanger 29 and the gas outlet or the valve 27 for the admixed laser gas are in this case arranged downstream of cooling tube 16 in relation to the flow direction of the laser gas and provide additional cooling of the laser gas cooled by the heat exchanger circuit 19 before the laser gas enters the corner block 4.

In the embodiments of the gas laser 1 shown in FIGS. 3a-c, to stabilize the temperature in the corner housings 4, 5 it is advantageous to minimize the influence of additional heat sources. In order to achieve this, each mirror element 7 can be arranged on a mirror support 30, which is fitted with a further cooling device 31 in the form of a cooling channel with coolant located therein in order to cool the mirror element 7 directly. The mirror supports 30 are thermally insulated from their respective corner housing 4, 5, in which the thermal insulation can be effected, for example, by way of steel screws while avoiding planar contact with the respective corner housings 4, 5. In addition, a resonator frame 33 shown in FIG. 3c, to which corner housings 4, 5 of the gas laser 1 are fastened, is provided with cooling channels that are connected to the cooling channels 20 of the corner housings 4, 5, so that the resonator frame 33 and the corner housings 4, 5 form a common coolant circuit and can be maintained at an (approximately) constant temperature.

With the above-described examples, it is assumed that the temperature of the cooling water 17, 21 is constant in the relevant region in which the cooling water comes into contact with the laser gas or with the main body of the corner housing 4. This approximation is justified, since the flow rate of the cooling water is selected so that the heat exchange with the laser gas or the 3 corner housing has only a marginal influence on the temperature of the cooling water 17, 21.

In the manner described above, the temperature $T_{G,K}$ of the cooled laser gas entering a particular corner housing 4, 5 and the temperature $T_{w,B}$ of a cooling fluid 21 of the corner housing 4, 5 can be approximately equalized with one another, so that no asymmetrical temperature gradient occurs in the corner housings 4, 5 and so the mirror elements 7, 8, 9 arranged in the corner housings 4,5, and the mirror supports 30 of the mirror elements are not undesirably tilted. As a result, an undesirable change in the direction of the laser beam 6 in the laser resonator 2 can be prevented and the beam quality of the output laser beam 10 can be increased.

A number of embodiments of the invention have been described. Nevertheless, it will be understood that various modifications may be made without departing from the spirit and scope of the invention. Accordingly, other embodiments are within the scope of the following claims.

What is claimed is:

1. A gas laser comprising:
   a plurality of discharge tubes, the discharge tubes being connected to together by corner housings, each corner housing comprising a mirror element for guiding a laser beam and a first cooling channel configured to allow flow of a first coolant;
   a primary heat exchanger circuit comprising a plurality of second cooling channels configured to allow flow of a second coolant, wherein each second cooling channel is configured to cool laser gas prior to the laser gas entering into one of the corner housings; and
   at least one temperature control device being selected from the group consisting of a laser gas cooling device, a coolant temperature control assembly configured to generate a temperature difference between the first coolant flowing in the first cooling channel of the corner housing and the second coolant flowing in the second cooling channel of the primary heat exchanger circuit, and combinations thereof, wherein the at least one temperature control device is configured to maintain a temperature difference of less than approximately 5 K between the first coolant flowing through the first cooling channel of the corner housing and the laser gas entering into the corner housing.

2. A gas laser according to claim 1, wherein the second cooling channel of the primary heat exchanger circuit and the first cooling channel of the corner housing belong to separate coolant circuits.

3. A gas laser according to claim 1, wherein the coolant temperature control assembly comprises a heating device configured to heat the first coolant flowing in the first cooling channel of the corner housing.

4. A gas laser according to claim 1, wherein the coolant temperature control assembly comprises a coolant cooling device configured to cool the second coolant flowing in the second cooling channel of the primary heat exchanger circuit.

5. A gas laser according to claim 1, wherein the laser gas cooling device comprises an expansion device configured to cause adiabatic expansion of the laser gas entering into the corner housing.

6. A gas laser according to claim 1, wherein the laser gas cooling device comprises a mixing device configured to admix additional laser gas.

7. A gas laser according to claim 1, wherein the laser gas cooling device comprises a Peltier element configured to cool the laser gas.

8. A gas laser according to claim 1, wherein the laser gas cooling device comprises a secondary heat exchanger.

9. A gas laser according to claim 1, further comprising, for at least one of the corner housings, thermal insulation between the mirror element and the corner housing.

10. A gas laser according to claim 1, further comprising, for at least one of the corner housings, a mirror cooling device configured to cool the mirror element of the corresponding corner housing.

11. A gas laser according to claim 1, further comprising:
a resonator frame comprising a third cooling channel, wherein the third cooling channel forms a common coolant circuit with the first cooling channel of each corner housing.

12. The gas laser according to claim 1, wherein the at least one temperature control device is configured to maintain a temperature difference of less than approximately 2 K between the first coolant and the laser gas entering into the corner housing.

13. The gas laser according to claim 1, wherein the at least one temperature control device is configured to maintain a temperature difference of less than approximately 0.2 K between the first coolant and the laser gas entering into the corner housing.

14. A method for operating the gas laser according to claim 1, the method comprising:
providing the first coolant to the first cooling channel of the corner housing;
providing the laser gas to the corner housing; and
maintaining a difference in temperature of less than approximately 5 K between the first coolant flowing through the first cooling channel and the laser gas entering into the corner housing.

15. The method according to claim 14, further comprising maintaining the difference in temperature between the first coolant flowing through the first cooling channel and the laser gas entering into the corner housing to be less than approximately 2 K.

16. The method according to claim 14, further comprising maintaining the difference in temperature between the first coolant flowing through the first cooling channel and the laser gas entering into the corner housing to be less than approximately 0.2 K.

* * * * *

UNITED STATES PATENT AND TRADEMARK OFFICE
CERTIFICATE OF CORRECTION

| | | Page 1 of 1 |
|---|---|---|
| PATENT NO. | : 8,817,833 B2 | |
| APPLICATION NO. | : 13/714914 | |
| DATED | : August 26, 2014 | |
| INVENTOR(S) | : Michael von Borstel | |

It is certified that error appears in the above-identified patent and that said Letters Patent is hereby corrected as shown below:

On the Title page, column 1, line 1, after "Related U.S. Application Data", delete "PCT/EP2001/059281" and insert --PCT/EP2011/059281--.

In the Specification

Column 1, line 9, delete "Jun. 6, 2012" and insert --Jun. 6, 2011--.

Signed and Sealed this
Fifth Day of May, 2015

Michelle K. Lee
*Director of the United States Patent and Trademark Office*